United States Patent

[11] 3,577,727

| [72] | Inventors | Joel A. Warren<br>Birmingham;<br>Frederick J. Marsee, Clawson, Mich. |
|---|---|---|
| [21] | Appl. No. | 765,361 |
| [22] | Filed | Oct. 7, 1968 |
| [45] | Patented | May 4, 1971 |
| [73] | Assignee | Ethyl Corporation<br>New York, N.Y. |

[54] METHOD OF REDUCING INTERNAL COMBUSTION ENGINE EMISSIONS
10 Claims, 5 Drawing Figs.

[52] U.S. Cl. .................................................. 60/29, 123/97
[51] Int. Cl. .................................................. F02b 75/10
[50] Field of Search ........................................ 60/29, 30; 123/97 (B), 119 (D)

[56] References Cited
UNITED STATES PATENTS

| 2,260,656 | 10/1941 | Bell | 60/29 |
| 2,851,852 | 9/1958 | Cornelius | 60/30 |
| 3,060,678 | 10/1962 | Ridgway | 60/30 |
| 3,234,924 | 2/1966 | May | 60/29 |
| 3,406,515 | 10/1968 | Behrens | 60/30 |
| 3,413,803 | 12/1968 | Rosenlund | 60/30 |
| 3,447,516 | 6/1969 | Bartholomew | 123/97 |

OTHER REFERENCES
Chandler et al., " Development of the Concept of Nonflame Exhaust Gas Reactors" SAE Paper No. 486M. March 12—16, 1962 Meeting Page 25. [Appt. already has copy]

*Primary Examiner*—Douglas Hart
*Attorney*—Donald L. Johnson

ABSTRACT: A system is described for reducing unburned hydrocarbons and carbon monoxide emitted from internal combustion spark ignition engines. The system comprises means for supplying a leaner-than-stoichiometric air/fuel mixture to the cylinders of the engine for combustion, means for conserving the heat of the exhaust products formed on combustion of the air/fuel mixture, and means for controlling the exhaust back pressure under low power demand. The means for conserving the exhaust heat includes the combination of an insulated exhaust port, insulated exhaust manifold and an insulated exhaust pipe; the back pressure control means consists of a valve placed in the exhaust pipe, said valve being responsive to vacuum signal and an exhaust back pressure signal.

A method of operating an engine utilizing said system is also described.

INVENTOR.
O. Joel Warren
Frederick J. Warren

INVENTOR.
JOEL A. WARREN
FREDERICK J. MARSEE

METHOD OF REDUCING INTERNAL COMBUSTION ENGINE EMISSIONS

BACKGROUND OF THE INVENTION

Unburned hydrocarbons and carbon monoxide are generally found in the exhaust gases obtained from a gasoline-fueled spark ignition internal combustion engine. Emission of these hydrocarbons and carbon monoxide into the air contributes to air pollution. Means of reducing these unburned hydrocarbons and carbon monoxides are available. Examples of such means include (1) a carburetor/induction manifold system which improves the mixing and metering of the fuel and air to the cylinders thereby improving combustion or (2) oxidizing the hydrocarbons found in the exhaust stream. In the latter case, extra air is generally pumped into the exhaust gas stream to provide oxygen necessary for the combustion of the unburned hydrocarbons. Although this latter method can conveniently be used to modify existing engines, it is difficult to obtain proper mixing of the air and hydrocarbons in the exhaust stream. Thus, the efficiency of the system is low and variable.

A system (1) which would reduce the hydrocarbons and carbon monoxide in the exhaust stream in a more efficient manner to hold these products at a low level and (2) which would overcome the problems in adding air into the exhaust stream, is an advance in the art. The present invention provides such a system.

SUMMARY OF THE INVENTION

A system of reducing exhaust emissions from the operation of an internal combustion spark ignition engine which comprises, (1) a fuel induction system capable of providing a substantially uniform mixture of fuel and air to the cylinders of said engine at an air-to-fuel ratio leaner than stoichiometric, (2) a means of reducing the heat loss in the exhaust gas formed on combustion of said mixture of air/fuel in said cylinders, said means including (a) an insulated exhaust port through which the exhaust gases from burning said air/fuel mixture are conducted out of the combustion chamber, (b) an insulated exhaust manifold integrally connected to said exhaust port into which said exhaust gases enter from said exhaust port, and (c) an exhaust pipe connected to said exhaust manifold through which said exhaust products are conducted into the atmosphere, and (3) an exhaust back pressure control valve situated in said exhaust pipe, said back pressure control valve being responsive to a carburetor vacuum signal and an exhaust back pressure signal.

DESCRIPTION OF THE PREFERRED EMBODIMENTS

Figure 1:
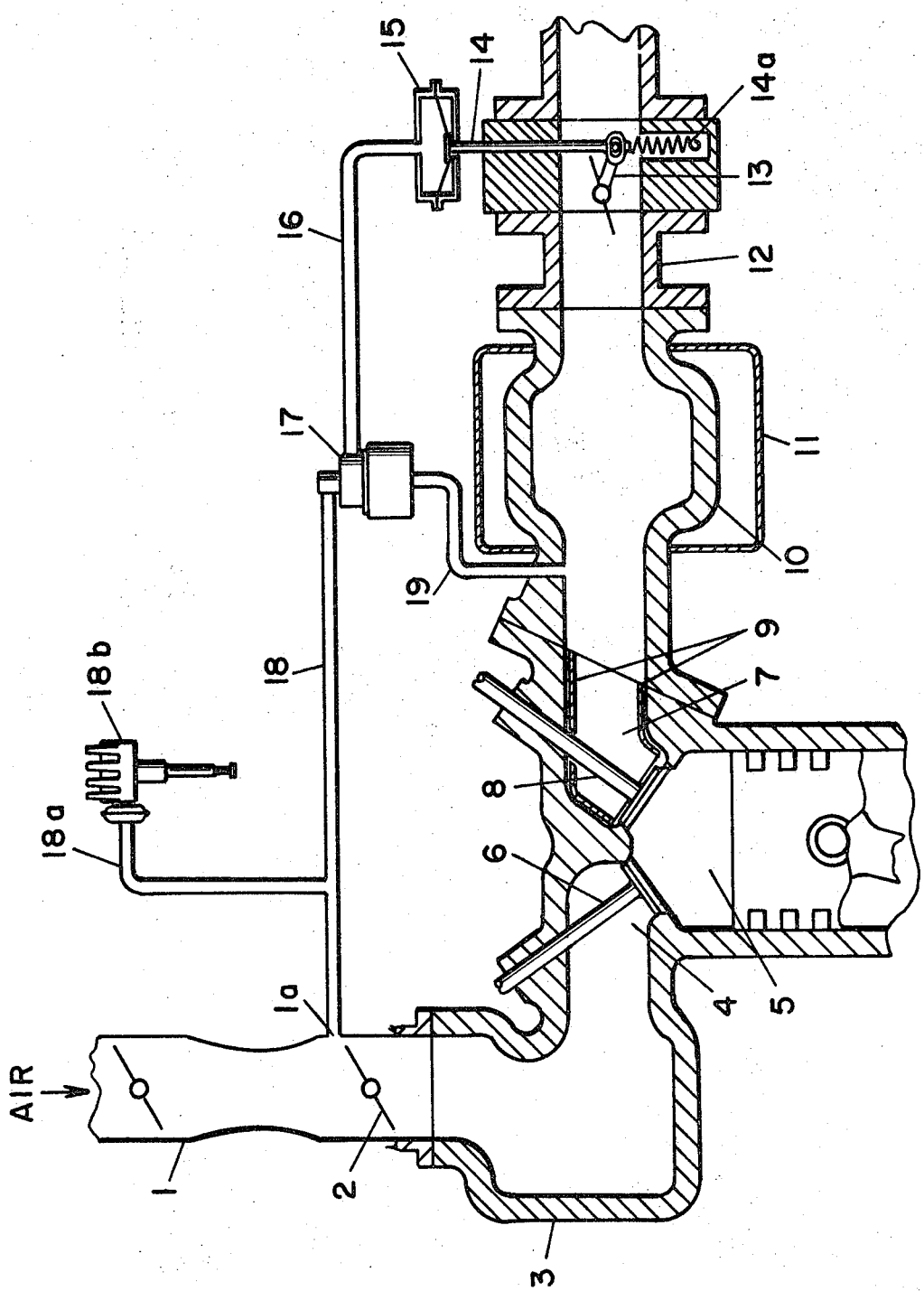
FIG. 1 is a schematic section illustration of an entire internal combustion engine system modified according to the invention.
Figure 1A:
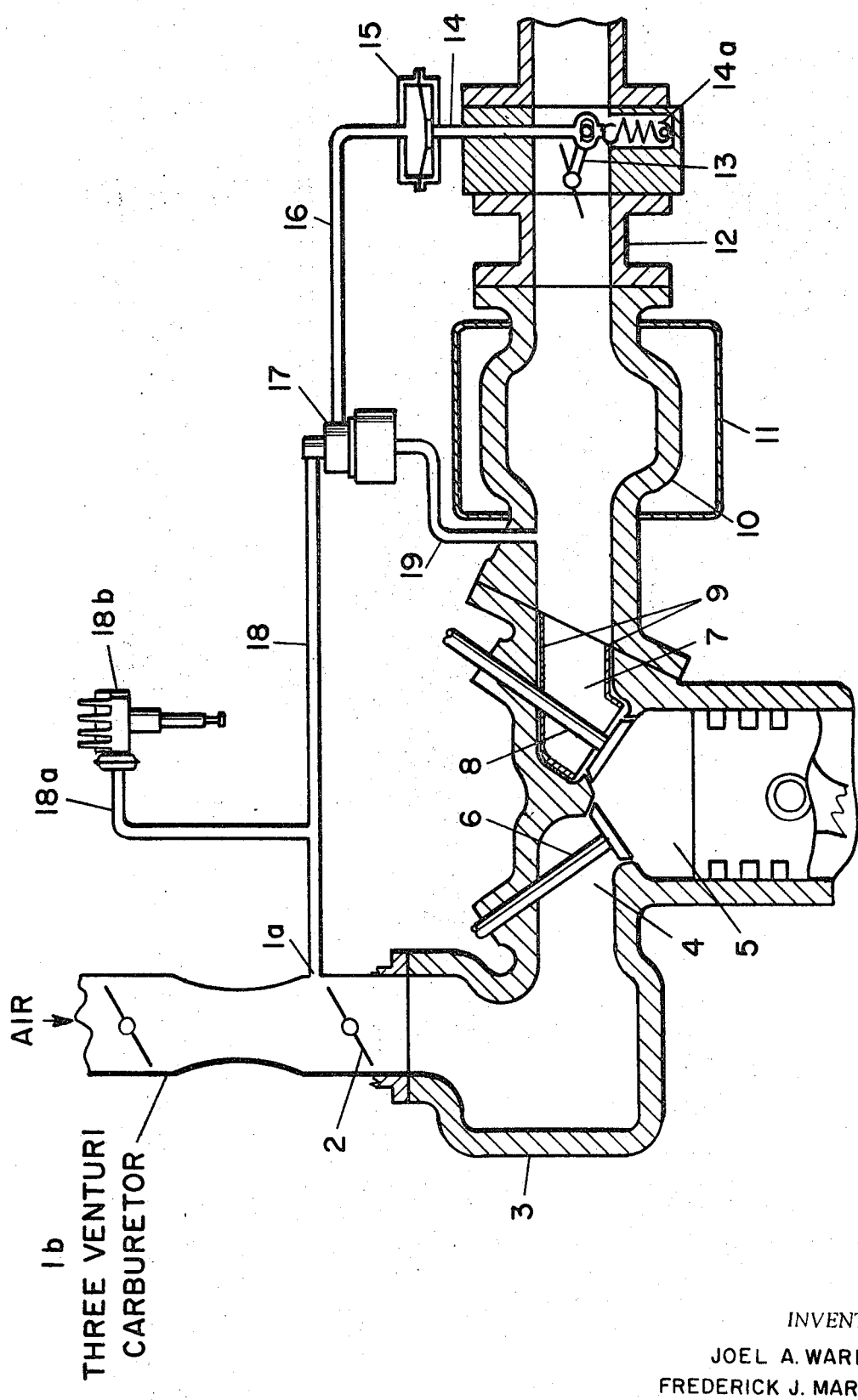
FIG. 1A is a schematic section illustration of an entire internal combustion engine system modified according to the invention and showing a three-venturi carburetor 1b.

A preferred embodiment of this invention is a system for reducing carbon monoxide and unburned hydrocarbons in the exhaust formed during the operation of a multicylinder spark ignition internal combustion engine which comprises (1) a fuel induction means capable of providing a substantially uniform mixture of air and fuel to said cylinders at an air-to-fuel ratio leaner than stoichiometric, (2) a means of reducing the heat loss in said exhaust gas formed on combustion of said air/fuel mixture, said means including (a) an insulated exhaust port in each of said cylinders through which said exhaust gas is conducted and (b) an insulated exhaust manifold integrally connected to said exhaust port into which said exhaust gas enters from said port, (c) an exhaust pipe connected at one end to said exhaust manifold and open at its opposite end to the atmosphere through which said exhaust gases are conducted and (3) means for controlling the exhaust back pressure under low power demand other than idle.

In a more preferred embodiment, said fuel induction means comprise a carburetor and an intake manifold. In a most preferred embodiment said carburetor is a three-venturi carburetor, said exhaust port is insulated by means of a sleeve positioned in said port so as to provide a layer of air between said sleeve and the inner surface of said exhaust port, and said means of controlling back pressure comprises a valve, which is responsive to a carburetor vacuum signal and an exhaust back pressure signal, situated in said exhaust pipe.

An induction system generally used in spark ignition internal combustion engines comprises a carburetor and an induction manifold. A carburetor meters fuel and air into the induction manifold for distribution into the cylinders. Any carburetor/intake manifold combination may be used in the present system. A preferred carburetor is the three-venturi carburetor described in a paper presented at the Society of Automotive Engineers meeting in Detroit, Mich., Jan. 10—14, 1966; the paper is entitled "Potentialities of Emission Reduction by Design of Induction Systems" by Earl Bartholomew. This particular carburetor with either single or dual intake manifold provides good engine operation and exceptionally uniform air/fuel mixture distribution. A system of metering fuel and air into the individual cylinders or into an intake manifold for distribution into the cylinders utilizing fuel injection rather than carburetion can also be used in the present invention.

It is essential that the induction system used provides an air-to-fuel mixture to the cylinder in leaner (greater) than a stoichiometric ratio. A stoichiometric ratio is that ratio of air to fuel at which sufficient oxygen is made available in the combustion chamber (cylinder) to effect complete combustion of the hydrocarbons present to $CO_2$ and $H_2O$. A leaner stoichiometric ratio is one in which more oxygen (air) is in the air/fuel mixture than is required to effect complete combustion of the fuel to $CO_2$ and $H_2O$. By utilizing a stoichiometric excess of air in the air/fuel mixture fed to the cylinders oxygen is made available in the exhaust gas to permit oxidation of the unburned hydrocarbons and CO in the system of the present invention. Thus, oxygen is made available directly into the exhaust; the mixture of the exhaust and oxygen is uniform; the necessity of injecting additional air into the exhaust is thus eliminated.

In general, an air-to-fuel ratio of 15.5:1 and higher can be used. Air-to-fuel ratios of 15.5:1 to 18:1 are preferable. When an air/fuel ratio of about 17:1 is used, about 3 percent oxygen by volume is made available in the exhaust for reaction with the hydrocarbons and carbon monoxide.

In order to reduce the heat loss in the exhaust gas formed on combustion of the air/fuel mixture in the engine, portions of the exhaust system beyond the cylinder are insulated. The elements which are insulated are (a) the exhaust port, (b) the exhaust manifold, and (c) the exhaust pipe. The exact means and/or materials used to insulate these components are not of critical importance. Thus, for example, the exhaust manifold may be insulated by coating its inner surface with a ceramic insulating material; it may be insulated by covering it with an insulator such as fiberglass and the like. The same applies to the exhaust pipe and exhaust port. The purpose of insulating these components of the exhaust system is, to minimize the heat loss of the exhaust gas. In general, any insulation of these components which will maintain the average exhaust temperature from the engine at above about 1,000° F. will be adequate for the purposes of this invention. By average exhaust temperature is meant an average of the exhaust gas temperatures measured in the exhaust port, in the exhaust manifold and in the exhaust pipe within 10 inches of the exhaust manifold.

FIG. 1 schematically illustrates one embodiment of the system of the present invention. Air and fuel are fed into the engine through the carburetor 1. Throttle plate 2 in carburetor 1 controls the amount of the air/fuel mixture which is introduced in to the intake manifold 3. In the intake manifold 3 the air/fuel charge is further mixed and is introduced through the intake port 4 into the combustion chamber (cylinder) 5 when intake valve 6 is open. The air/fuel mixture is burned in the combustion chamber 5 producing power and exhaust products (exhaust). The exhaust is conducted out of the combustion chamber 5 through exhaust port 7 when valve 8 is open. Exhaust port 7 has an insulating liner 9 which reduces loss of exhaust gas heat. The exhaust gas passes through the exhaust port 7 into the exhaust manifold 10. The exhaust manifold 10 is insulated with an external shroud 11. The exhaust gases pass from the exhaust manifold 10 into the exhaust pipe 12 which conducts the exhaust gases into the atmosphere. Situated in the exhaust pipe 12 is a back pressure valve means 13 which modulates the back pressure in the exhaust system. The pack pressure valve means 13 is connected by a control rod 14 to a vacuum operator unit 15. Said vacuum operator unit 15 is in turn connected by a conduit 16 to a sensing unit 17; said sensing unit 17 is in turn connected (i) by conduit 18 to an opening 1a in the carburetor 1 above the carburetor throttle plate 2 and (ii) connected by conduit 19 into the exhaust manifold 10. These connections provide the sensing unit 17 with a vacuum signal and a back pressure signal for the vacuum operator unit 15. A feature of obtaining the vacuum signal for sensing unit 17 from the carburetor 1 at opening 1a is that no vacuum signal is obtained (a) when the engine is idling and (b) when the carburetor throttle plate 2 is substantially wide open. By substantially wide open is meant that the carburetor throttle plate 2 is substantially parallel to the long axis of the carburetor 1. Since there is no vacuum signal during idle or wide open throttle (carburetor), the exhaust stream is not subject to throttling by the exhaust valve means 13 during these two engine operating conditions. Obtaining the vacuum signal from the carburetor as illustrated in FIG. 1 then is a preferred embodiment. However, the vacuum signal provided to the sensing unit 17 might also be obtained from the intake manifold; or vacuum might be provided by an auxiliary vacuum pump driven by the engine. Operation of the back pressure valve means 13 and its attendant vacuum operator 15 and sensing 17 units is explained in greater detail below.

Since the vacuum signal obtained at opening 1a in carburetor 1 can also generally be used to advance the spark, FIG. 1 shows the distributor 18b connected to this vacuum source via conduits 18 and 18a. This arrangement, although convenient, is not required for the purposes of the present invention.

Figure 2:
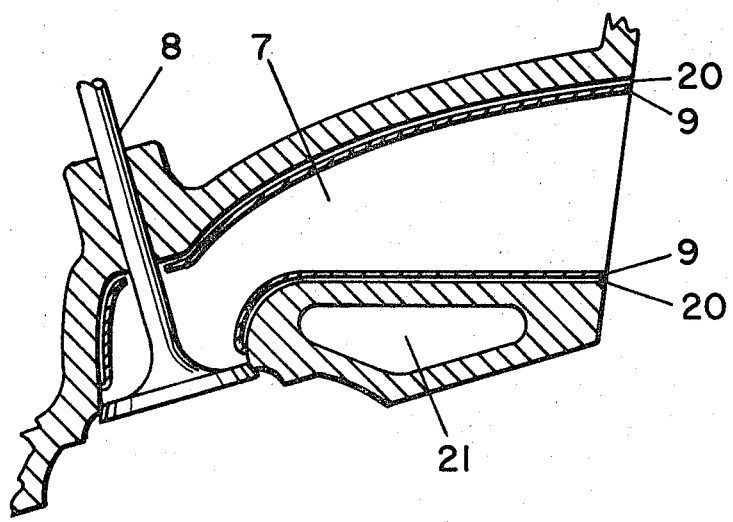
FIG. 2 is a section view of an insulated exhaust port.

FIG. 2 is a section view of an insulated exhaust port 7 of FIG. 1. The insulating sleeve liner 9 is positioned in the body of the port 7 so as to provide an air space 20. The liner thus positioned effectively insulates the exhaust port thus reducing heat loss from the exhaust gas as it passes out of the combustion chamber through the port 7 when the valve 8 is opened. The insulating sleeve 9 may be made of any suitable material having the required thermal and mechanical stability. Stainless steel is an example of a suitable material for this insulating sleeve. The port may also be insulated by bonding a suitable material directly to the inner portion of the port without forming any insulating air space. For example, that portion of the port 7 in FIG. 2 which is insulated by the sleeve may simply be coated with a ceramic material of proper thickness. The insulating sleeve may also be cast as an integral part of the exhaust port. Such a ceramic material may be a mixture of Sauereisen Cement 31 and CA-25 calcium aluminate powder. The enclosed area 21 in FIG. 2 is an opening through which coolant fluid passes in order to maintain a certain operating temperature for the engine when in operation. By reducing the size of this area 21, the temperature of the exhaust port 7 would effectively be raised. This type of modification therefore offers another means of reducing heat loss of the exhaust gas passing through the exhaust port.

Figure 3:
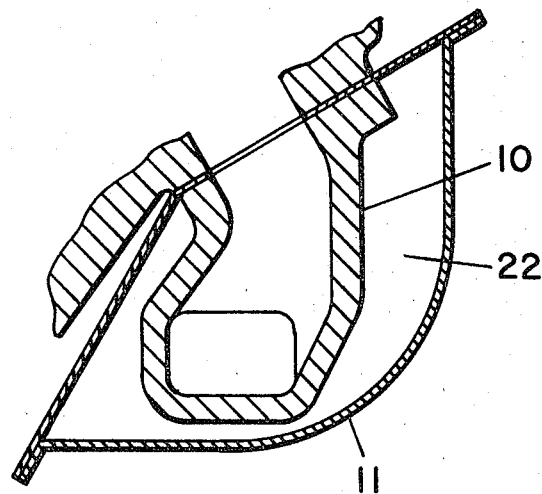
FIG. 3 is a section view of a shrouded exhaust manifold.

FIG. 3 illustrates a partial section view of an exhaust manifold 10 insulated by means of an external covering or shroud 11. The shroud 11 is positioned over the manifold 10. The shroud thus provides an air space 22 which acts to insulate the manifold 10. This air space 22 may be packed if desired with conventional insulating materials which have the necessary thermal stability such as fiberglass, asbestos and the like. The shroud 11 may be made of sheet metal or any other material which has adequate strength and durability, and which can be shaped to fit a manifold. In order to provide some means of control over the temperature of the shrouded manifold, conventional venting means may be provided in the shroud itself. The manifold may also be insulated internally in a manner similar to that described for the exhaust port above. Another convenient method of insulating the exhaust manifold is to apply a coating of a ceramic material such as Sauereisen Cement to the inner surface of the manifold. A coating about ⅛-inch thick is useful although thicker sections can also be used. A combination of the external shroud and an internal insulating coating can also be utilized.

Figure 4:
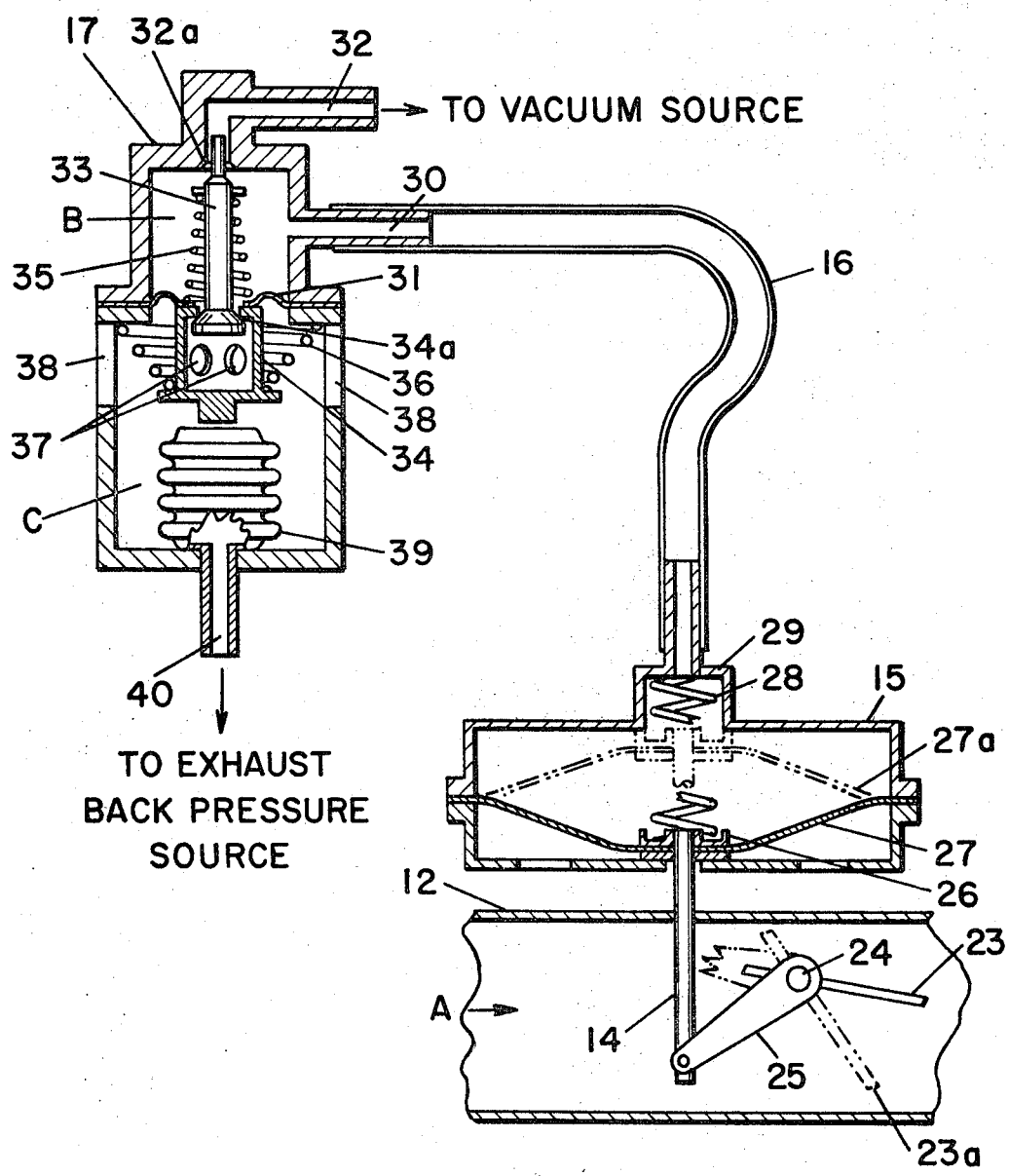
FIG. 4 is a section view of an exhaust back pressure valve, valve control unit and sensing unit.

FIG. 4 is a partial section view of the exhaust back pressure valve means 13 situated in an exhaust pipe 12 and its attendant vacuum operator unit 15 and sensing unit 17. The back pressure valve means comprises a circular throttle plate 23 having a diameter substantially equal to the inside diameter of the exhaust pipe 12. This throttle plate 23 is mounted inside the exhaust pipe 12, on a shaft 24, in a position perpendicular to the exhaust flow direction (as indicated by arrow A) from an unillustrated engine. The shaft 24 is attached to one end of an arm 25; the other end of said arm 25 is pivotally attached to one end of a control rod 14. The position of the throttle plate 23 in the exhaust pipe 12 is determined by the position of the control rod 14. The other end of the control rod 14 is seated in a holding member 26 which is integrally connected to a flexible diaphragm 27. The flexible diaphragm 27 is contained within the vacuum operator unit 15. The spring 28 is mounted within the vacuum operator unit 15 behind the control rod 14; spring 28 is seated at one end in the holding member 26 and at the opposite end in a well 29 in said vacuum operator unit 15. (In the schematic drawing of FIG. 1, a spring 14a is shown outside the vacuum operator unit 15; this is an alternate position for this spring. Its function is identical with that of spring 28 in FIG. 4). This spring 28 normally maintains the diaphragm 27 in the down position; as will be shown later, a vacuum signal will raise the diaphragm 27 to the up position 27a (phantom illustration). The vacuum operator 15 is connected by conduit 16 to a port 30 in sensing unit 17. The flexible diaphragm 31 divides the sensing unit 17 into two compartments, B and C. Compartment B is connected to the vacuum operator 15 by conduit 16; and B is also connected to an engine vacuum source (preferably above the carburetor throttle blade as has been described above) through opening 32. Compartment B contains a metering element 33 mounted vertically and seated at 34a in a bleed control element 34 which is integrally connected to the diaphragm 31; a spring 35 encircles metering element 33. This spring 35 maintains the metering element 33 in an upright position in compartment B and holds the lower end of metering element 33 in contact with the bleed control element 34 at 34a. The bleed control element 34 extends below said diaphragm 31 into compartment C. A spring 36 encircles the bleed control element 34 to maintain it in a vertical position in compartment C. Bleed control element 34 has a plurality of ports (openings) 37 which permits bleeding of the vacuum in compartment B as will be described below. Compartment C is open to the atmosphere at 38. Compartment C also contains a flexible bellows 39 which is connected through outlet 40 to an exhaust back pressure source. The sensing unit 17 is thus responsive to the exhaust back pressure as well as a vacuum signal.

The combination in FIG. 4 operates as follows. When a vacuum signal is received through opening 32 into compartment B, it is directly transmitted via outlet 30 and conduit 16 to the vacuum operator unit 15. The vacuum acts on the flexible diaphragm 27 pulling it upwards towards position 27a against the action of spring 28. This movement of the diaphragm 27 moves rod 14 upwardly; this movement in turn actuates arm 25 to move the exhaust throttle plate 23 to a closed position (position 23a). The flow of the exhaust gas in exhaust pipe 12 is thereby throttled and the exhaust back pressure increased.

As the exhaust back pressure begins to increase, this increase is communicated to the bellows 39 through opening 40. Opening 40, as pointed out above, is connected to an exhaust back pressure source which is shown in the embodiment illustrated in FIG. 1 to be the exhaust manifold 10. The bellows 39 expands in response to this exhaust back pressure signal. As the bellows 39 expands, it contacts the bleed control element 34 and pushes it upwardly. This action in turn raises metering element 33 until the upper end of element 33 seats in the outlet 32 at the seat 32a. When the element 33 is so seated, the vacuum signal entering compartment B through opening 32 is cut off. However, the vacuum in compartment B continues to act on diaphragm 27 in the vacuum operator 15. As the exhaust back pressure continues to increase, the bleed control element 34 continues to be raised by the bellows 39 until the bleed control element 34 becomes disengaged from the lower end of metering element 33 at point 34a. This then permits the vacuum in compartment B to be bled off via the ports 37 in the bleed control element 34. As the vacuum is bled from compartment B in this way, the spring 28 acts to move diaphragm 27 downward, thereby moving the exhaust throttle plate 23 to the open position. This opening of the exhaust throttle plate 23 effects a reduction of the exhaust back pressure. The vacuum is bled out of compartment B until the back pressure of the exhaust system is decreased to the point where the bellows 39 in response to this back pressure reduction moves down far enough to allow the bleed control element 34 to once again engage the lower portion of the metering element 33 at 34a; this terminates the bleeding. If the back pressure decreases further, then the metering element 33 drops away from its seat 33a again allowing the vacuum signal from an engine vacuum source to again enter compartment B and the sequence described above is repeated. By balancing the force of spring 28 against the vacuum communicated to the vacuum operator 15 from compartment B of the sensing unit 17 and relating it to the rate of expansion of the bellows 39 in response to exhaust pressure, the exhaust back pressure can be controlled at a substantially uniform level under low power demand engine operation.

The dimensions of the various components in the system of the present invention are not considered to be of essential importance. There are standard size relationships known to those skilled in the internal combustion engine art relating intake and exhaust manifold size to intake and exhaust valve openings and the like. Thus, the size and shape of the intake manifold, the exhaust port, the exhaust manifold, and the exhaust pipe may each or all be varied keeping within these art-recognized size relationships. From a practical standpoint inserting insulation as for example the sleeve in the exhaust port, does restrict passage of exhaust gas through this port; it is obvious that a larger sized exhaust port would be a practical expedient to alleviate this problem.

Increasing volumes of exhaust system elements such as the exhaust manifold and the exhaust pipe, beyond the size normally considered to be adequate in standard internal combustion engine construction is also encompassed within the scope of this invention. Enlarging these latter areas effectively reduces the velocity of the exhaust gas passing through and would enhance the effectiveness of the present system of reducing hydrocarbon and carbon monoxide emissions. In other words enlarging the exhaust manifold and exhaust pipe would permit the exhaust gasses now containing excess air intimately mixed therewith, to remain in these hot zones for a longer time, thus enhancing reaction and reducing the unburned hydrocarbons and carbon monoxide emissions.

The effectiveness of the above-described system in reducing exhaust emissions was demonstrated by modifying standard automobile engines in standard automobiles. The first engine (Engine A) was a regular production model, b 389 cu. in. displacement, V8 having a compression ratio of 10.5:1. It was modified by (a) replacing the standard carburetor with a three-venturi carburetor of a type referred to above, (b) adding a deceleration control as described in a Society of American Engineers (SAE) paper entitled "Potentialities of Further Emission Reductions by Engineering Modifications" by Lamonte Eltinge, Frederick J. Marsee and A. Joel Warren, presented at the Jan. 8—12, 1968, SAE meeting, Detroit, Mich., (c) adding a back pressure control valve as described herein, (d) insulating the exhaust manifold with an external shroud as illustrated in FIG. 3 and an internal coating of a ceramic insulating material, (e) insulating the exhaust port as illustrated in FIG. 2, and (f) enlarging the exhaust pipe from 1¾ inches to 2⅞ inches inside diameter and insulating it externally.

The second engine (Engine B) was a regular production 400 cu. in. displacement, V8 engine having a compression ratio of 10.5:1. The engine was modified by (1) replacing the regular production carburetor with a three-venturi carburetor of the type referred to hereinabove which included an art-recognized modification to increase the airflow velocity, (2) increasing the volume and insulating the exhaust manifold by inserting a stainless steel sleeve in the manifold body, forming a ½-inch space between said sleeve and the inside surface of the manifold and subsequently filling said space with a fiberglass insulating material, (3) insulating the exhaust port as illustrated in FIG. 2, (4) increasing the exhaust pipe inside diameter and insulating this exhaust pipe with an external insulating material wrapping, and (5) installing a back pressure valve system as hereinabove described. The alterations in the size of the exhaust manifolds and exhaust pipe in Engine B effected a total increase in exhaust volume as compared to the standard engine. The total volume of the exhaust manifolds and the exhaust pipe (up to the back pressure valve) in the standard 400 cu. in. V8 engine before it was modified to make Engine B was 437 cu. in.; the total volume of this same engine modified as described above to give Engine B, was 961 cu. in.

The hydrocarbon emissions were determined for each modified engine, that is Engine A and Engine B, using the "-Test Procedure for Vehicle Exhaust Emissions" described in the manual entitled "California Test Procedure and Manual for Motor Vehicle Exhaust Emission Control" published by the State of California Motor Vehicle Pollution Board, Mar. 9, 1966, revision. This test procedure is commonly referred to as the "California Seven Mode Cycle Test."

The results obtained from these tests are contained in table 1 below. The air-to-fuel ratio in each instance was leaner than stoichiometric.

TABLE 1.—EXHAUST EMISSIONS FROM TWO ENGINES MODIFIED ACCORDING TO THE SYSTEM OF THE PRESENT INVENTION

| Engine number: | Hydrocarbons,[1] p.p.m. by volume | Carbon monoxide[1] percent by volume |
|---|---|---|
| A | 58 | 0.5 |
| B | 21.6 | 0.335 |

[1] Non-Dispersive Infrared (NDIR) analysis.

It is evident from the data in table 1 that the system in the present invention effectively reduces the hydrocarbon emissions from an internal combustion engine to less than about 60 parts per million (p.p.m.) by volume; carbon monoxide content of the exhaust is also at a significantly low level.

The combination of this invention offers a number of outstanding advantages. It provides a means for reducing hydrocarbon emissions from an internal combustion engine to the very low level of less than 60 p.p.m. by volume. Secondly, the system does not require any drastic re-engineering of a standard internal combustion engine to produce its effect. In general, with the exception of the exhaust port liner, all the essential elements of the system (as illustrated in Engines A and B above) can be added externally to a regular production automobile engine. An insertable exhaust port liner which may be used in the present system is described in an SAE paper entitled "Design Factors Affecting Performance of Exhaust Manifold Reactors" by E. N. Cantwell and A. J. Pahnke; the paper was presented and published at the midyear SAE meeting in Chicago, May 17—20, 1965. Finally, the system of the present invention, especially the specific embodiments herein described, when installed in the engine of a regular production automobile, does not adversely affect the automobile's driveability. This driveability criterion is not susceptible to a truly scientific determination. However, automobiles whose engines have been modified according to the system of the present invention have been road tested and found to have performance characteristics essentially equivalent to those of the standard automobile. By standard automobile is meant a current production model of a regular production automobile.

The combination described wherein an internal combustion engine utilizes (a) a "lean" air/fuel mixture (air/fuel ratio leaner than stoichiometric), (b) a means of conserving the exhaust heat, and (c) a back pressure control valve, is shown to effectively reduce hydrocarbon and carbon monoxide emissions from the engine. A specific system is described; modifications of this system which would be obvious to those skilled in the art are intended to be encompassed within this disclosure.

Having fully described the present invention, it is desired that it be limited only within the spirit and scope of the following claims.

We claim:

1. A system for reducing exhaust emissions from a spark ignition internal combustion engine having at least one cylinder which comprises in combination:
  1. a fuel induction system having a throttle valve, said system being suitable for providing to each cylinder of said engine a substantially uniform mixture of air and fuel, at an air-to-fuel ratio leaner than stoichiometric,
  2. an insulated exhaust port of said cylinder through which exhaust products formed on burning said air/fuel mixture in said cylinder are conducted,
  3. an insulated exhaust manifold, directly connected to said insulated exhaust port, into which said exhaust products further pass, said exhaust manifold having at least one additional opening,
  4. an exhaust pipe, connected at one end to said additional opening in said exhaust manifold and open at its opposite end to the atmosphere through which said exhaust products are conducted into the atmosphere, said exhaust pipe having an inside diameter at least equal to the inside diameter of said additional opening in said exhaust manifold,
  5. a back pressure valve situated in said exhaust pipe, said valve being responsive to an induction system vacuum signal taken from a point upstream of said throttle valve and an exhaust back pressure signal whereby the flow of said exhaust products is throttled under low power demand, said system effectively reducing the hydrocarbon and carbon monoxide content in said exhaust products emitted into the atmosphere.

2. The system of claim 1 wherein said engine has more than one cylinder.

3. The system of claim 1 wherein said induction system comprises a carburetor and an intake manifold and said air-to-fuel ratio is greater than about 15.5:1 by weight.

4. The system of claim 2 wherein said induction system comprises a carburetor and an intake manifold and said air-to-fuel ratio is greater than about 15.5:1 by weight.

5. The system of claim 4 wherein said insulated exhaust port consists of a stainless steel sleeve placed inside said exhaust port such that an air space is formed between said sleeve and the inner surface of said exhaust port, wherein said exhaust manifold is insulated with an exterior metal shroud enclosing said manifold and wherein said exhaust pipe is insulated externally by applying thereto a suitable insulating material.

6. The system of claim 5 wherein said carburetor is a three-venturi carburetor.

7. The system of claim 1 wherein the total volume of the exhaust chamber provided by said insulated exhaust manifold and said exhaust pipe up to said back pressure valve is more than twice the volume of the exhaust chamber provided by a standard exhaust manifold and a standard exhaust pipe up to said back pressure valve.

8. The system of claim 4 wherein the total volume of the exhaust chamber provided by said insulated exhaust manifold and said exhaust pipe up to said back pressure valve is more than twice the volume of the exhaust chamber provided by a standard exhaust manifold and a standard exhaust pipe up to said back pressure valve.

9. The system of claim 5 wherein the total volume of the exhaust chamber provided by said insulated exhaust manifold and said exhaust pipe up to said back pressure valve is more than twice the volume of the exhaust chamber provided by a standard exhaust manifold and a standard exhaust pipe up to said back pressure valve.

10. The system of claim 6 wherein the total volume of the exhaust chamber provided by said insulated exhaust manifold and said exhaust pipe up to said back pressure valve is more than twice the volume of the exhaust chamber provided by a standard exhaust manifold and a standard exhaust pipe up to said back pressure valve.